United States Patent [19]

Tissier et al.

[11] Patent Number: 5,677,832
[45] Date of Patent: Oct. 14, 1997

[54] ACTIVE FILTER

[75] Inventors: Jean-François Tissier, Chasseneuil du Poitou; Metin Gogce, Saint Georges les Baillargeaux; Jean-Philippe Huet, Poitiers, all of France

[73] Assignee: Schlumberger Industries, S.A., Montrouge, France

[21] Appl. No.: 372,473

[22] Filed: Jan. 13, 1995

[30]  Foreign Application Priority Data

Feb. 4, 1994 [FR] France ................... 94 01261

[51] Int. Cl.⁶ .............................. H02M 1/12
[52] U.S. Cl. ................ 363/41; 307/105; 323/210
[58] Field of Search .................. 323/210; 363/39, 363/41; 307/105

[56]  References Cited

U.S. PATENT DOCUMENTS

5,321,598  6/1994  Moran ................................. 363/41
5,343,079  8/1994  Mohan et al. ...................... 307/105

*Primary Examiner*—Stuart N. Hecker
*Attorney, Agent, or Firm*—Leonard W. Pojunas

[57]  ABSTRACT

An active filter for compensation of polluting harmonics on an electricity distribution network comprising a source of energy (19, 20), a bridge converter (21) connected between the energy source and the network, control means which control the bridge converter in order to compensate for the polluting harmonics, characterized in that the state of the energy source (19, 20) is independant of the control of the bridge converter carried out by the control means (22) and in that the control means (22) control the injection of the harmonic components independantly of the state of the energy source.

13 Claims, 6 Drawing Sheets

ACTIVE FILTER

The present invention relates to an active filter for injecting harmonic components on an electricity distribution network.

Conventional solutions for removing the polluting effects of harmonics on an electricity supply network, such as a passive filter comprising capacitors and inductances tuned to the frequence of the perturbations, present certain disadvantages in view of their static nature. If the network changes, the filter may become inoperational, requiring modification or replacement of the filter.

These inconveniences are avoided by the use of active filters. These active filters are connected in parallel or in series with the network (in order to suppress current or voltage harmonics, respectively) and comprise an energy storage element (a capacitor or an inductance, respectively) connected to an inverter bridge or bridge converter, which comprises a series of transistor switches and which is connected to the network via a transformer. A control device measures the currents or voltages in the network and the energy stored in the energy storage device. It controls the storage element and the bridge converter in order to compensate for the effects of harmonics and in order to reconstitute the sinusoidal waveform of the fundamental of the network.

The principal of filters of this type is the exchange of energy between the network and the energy storage element. That is, for a waveform deformed by harmonics, the element of energy storage is controlled to absorb the excess energy of the waveform, visa visa sinusoidal waveform, and to return this energy to the network in order to reconstitute the sinusoidal waveform. In order to do this, the current control device controls the bridge based on the difference between the currents and voltages measured, the reference waveforms and the value of energy stored in the storage element, in order to maintain the charge stored in the storage element at a constant value.

An active filter of this type, having a control device which suppresses harmonics and maintains the charge stored in a capacitor at a constant value, is described in the article "Control Strategy of Active Power Filters Using Multiple Voltage-Source PWM Converters", Hirofumi Akagi et al, IEEE Transactions on Industry Applications, Vol. IA-22, N° 3, May/June 1986. Other examples of known active filters are discussed in the patents U.S. Pat. No. 4,835,411 and U.S. Pat. No. 4,651,265.

The patent application PCT WO 94/05067 shows another example of a conventional active filter based on the principal of energy exchange between the network and an energy storage element. The filter comprises a transconductance amplifier and a capacitor, the charge stored in the capacitor being maintained at a constant value by the amplifier in order to absorb or supply energy to the network to compensate for polluting harmonics. See FIG. 4 and page 11, lines 14 to 29.

The patent application PCT WO 89/06879 describes another active filter, in which the control system for compensating for harmonics is based on a measurement of the amplitude of polluting harmonics existing on the network upstream of a point of connection of the filter to the network and a measurement of the harmonics remaining on the network downstream of the point of connection. The measurement of polluting harmonics downstream of the connection point only includes information regarding the amplitude of the harmonics and the system does not regulate phase differences which can arise.

The article "Analysis and Design of a New Active Power Filter . . . " in IAS 93: Conference Record of the 1993 IEEE Industry Applications Conference, Twenty Eighth IAS Annual Meeting, describes an active filter of the kind adapted to compensate for harmonics on the neutral of the network and which uses energy storage elements fed by the secondary of a transformer connected to the phases of the network. The currents taken from the phases and the state of the storage elements depends on the harmonics applied to the network. This system permits the compensation of only homopolar harmonics present on the neutral and does not compensate for non-homopolar currents present on the live phases. Furthermore, the system requires a redimensionning of the elements of the filter to manage the large currents induced in the transformer secondary.

The patent U.S. Pat. No. 4,053,820 describes an active filter having a source of continuous current, being a rectifier bridge connected to the network, which feeds a bridge converter in order to generate a compensating harmonic. The rectifier is controlled in order to supply a current having the same amplitude as the polluting harmonic and the bridge converter is controlled in order to generate a harmonic having the correct phase. The system is essentially single frequency and requires a rather complex control of the state of the current source.

Other examples of active filters are described in the article "Dealing with Line Harmonics . . . ", Instruments and Control Systems, Vol. 66, n° 4, April 1994 (Radnor U.S.) and the article "A New Injection Method . . . " IEEE Transactions on Industrial Electronics and Control Instrumentation, Vol. 35, n° 1, February 1988, NEW YORK U.S., pages 141–147.

Conventional active filters present certain problems. In particular, they use a storage element of a large size which must be continually recharged. Since a part of the fundamental waveform is taken by the storage element, the bridge converter must be capable of passing the fundamental waveform. The dimensions and size of the semiconductors used in the bridge are thus subject to supplementary constraints. Furthermore, the maintenance of a constant value of charge in the storage element requires a control device of a certain complexity and having a control algorithm which is a function of several measured values, including the value of the charge in the storage element. An error in the control can decharge or overcharge the storage element with serious consequences with regard to the compensation of harmonics. Conventional devices must therefore be constructed with rather complex safeguards.

The present invention concerns an active filter adapted to compensate polluting harmonics on an electricity distribution network and comprising a source of energy, a bridge converter connected between the source and the network, control means for controlling the bridge converter in order to compensate for polluting harmonics, characterised in that the state of the energy source is independant of the control of the bridge converter carried out by the control means and in that the control means controls the injection of harmonics on the network by the bridge converter independantly of the state of the energy source.

Thus, the present invention avoids the problems due to the use of a large energy storage element which is charged and decharged by the bridge converter. In particular, the invention provides a system having a control device greatly simplified in comparison with conventional devices which survey the charge stored in the storage element. Since the energy source is not charged by the bridge converter, the bridge converter handles only harmonic components (rather than a part of the fundamental waveform as well as the harmonics) and the dimensions and tolerance of the semiconductors used in the bridge can be reduced. The present invention equally avoids the dangers associated with a storage element which can be decharged or over-charged and the energy source of the present invention can have a greatly simplified construction.

According to one embodiment, the energy source is fed by the electricity distribution network. For example, the source of energy can comprise a bridge rectifier connected to the network in order to supply a continuous voltage which is modulated by the bridge converter in order to create harmonic components. In other embodiments, the energy source can be completely independant of the network. In each case, the supply of power to the energy source via a bridge converter which controls the injection of the harmonic components is avoided.

Preferentially, the active filter further comprises a coupling circuit connected between the bridge converter and the electricity distribution network, the coupling circuit comprising one or more resonant circuits adapted to minimise the power loss during the injection of harmonic components and to block the transmission of the fundamental of the network to the elements of the filter, the tuning frequency of the resonant circuits being a function of the frequencies and amplitudes of the harmonic components to be injected. Since the energy source is not supplied via the bridge converter and the active filter handles only harmonics, filtering of the fundamental waveform can be carded out in order to ensure that the bridge converter is not overcharged by the fundamental of the distribution network.

The exact tuned frequency of the resonant circuit depends on the relative importance of the harmonics to be injected, which can be determined before installing the filter. For example, if it is necessary to inject equal amounts of the 3rd and 5th harmonics, the tuned frequency will be close to the central frequency, that is, close to the intermediate value between the 3rd and 5th harmonics. Alternatively, if it is necessary to inject more of the 3rd harmonic than the 5th, the tuned frequency of the resonant circuit will approach the frequency of the third harmonic rather than the 5th harmonic.

Preferentially, the control means of the filter comprises a synchronisation circuit which synchronises the control of the bridge converter with the network frequency. This synchronisation avoids all problems of beating between the injected harmonics and the polluting harmonics on the network.

According to one embodiment, the control means comprises a filter circuit connected to the distribution network and permitting the isolation of each one of the polluting harmonics present on the network, and a processing circuit connected to the filter circuit, which produces a series of harmonic components of opposing phase to be injected on the network in order to suppress the polluting harmonics. According to one embodiment, the control means comprises a summing circuit which sums the harmonic components in order to produce a single signal which controls the bridge circuit in order to inject the harmonic components.

Preferentially, the control means comprises a correction circuit which measures and isolates each harmonic injected by the coupling circuit, and which corrects the processing circuit in order to compensate for the remaining differences between the injected harmonics and the polluting harmonics on the network. The correction circuit can also correct the processing circuit in order to compensate for the amplitude differences between the injected harmonics and the polluting harmonics on the network.

According to another embodiment the correction circuit can measure the polluting harmonics remaining on the network downstream of the injection in order to regulate the amplitude of the injected harmonics. However, this embodiment does not permit the compensation of phase differences arising in the system and, consequently, is less reliable than the other embodiment.

The present invention applies equally to the injection of harmonics on a polyphase network as well as on a single phase network. For an active filter adapted to be connected to a three phase network, the coupling circuit can comprise two resonant circuits for injecting the harmonics on two phases with a connection between the phases in order to balance the injection of harmonics between the three phases.

According to one embodiment for polyphase networks, the active filter is adapted to inject certain harmonics amongst a series of harmonic components on certain phases of the network. For example, for a three phase network with neutral, the active filter can be adapted to inject selected harmonic components on the neutral in order to compensate polluting harmonics which are homopolar on the phases of the network. In this case, the control means can survey the polluting harmonics either via a sensor dedicated to the neutral or via sensors connected to the three phases. The non-homopolar harmonics can be compensated individually on each phase, as before.

According to one embodiment, the active filter injects current components on the network. In another realisation, the active filter injects voltage components on the network.

The invention will be better understood on reading the description which follows of several embodiments of the invention, given by way of non-limitating examples and with reference to the attached drawings, in which.

Figure 1:
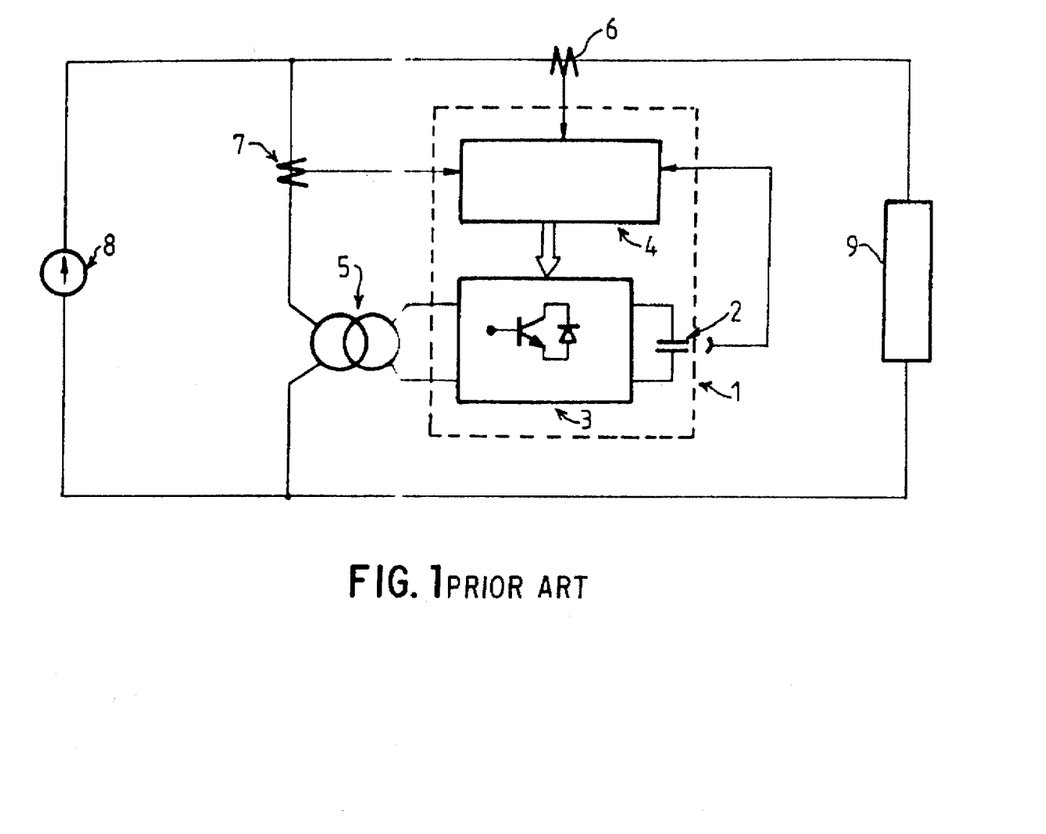
FIG. 1 shows an example of an active filter as per the art anterior.

As shown in FIG. 1, an active filter as per the art anterior comprises an energy storage element 2, in this case a capacitor, connected to a series of transistor switches comprising a monophase bridge converter 3, controlled by a current controller 4 and connected to the secondary winding of a transformer 5. The current controller 4 measures the currents present in the network and in the primary winding of the transformer via the current sensors 6, 7. The controller uses a command of the type Pulse Width Modulation (PWM) in order to control the bridge converter depending on these measurements and the charge stored in the capacitor. The active filter is connected in parallel in the network between the source of a.c. power and a polluting load 9 in order to compensate for perturbations of current due to the polluting load.

Figure 2:
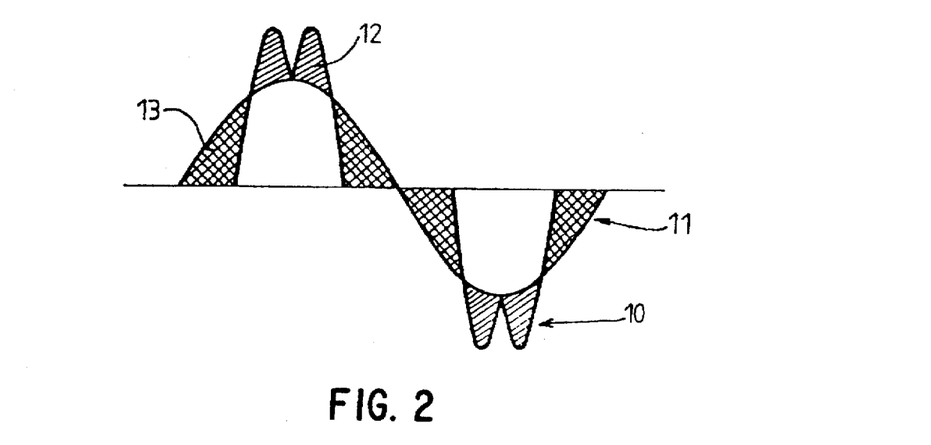
FIG. 2 represents the exchange of energy which is carried out by the filter of FIG. 1 in order to compensate for deformations of the sinusoidal waveform of the network.

As shown in FIG. 2, the principal of conventional active filters is the exchange of energy between the network and the energy storage element, the controller controlling the bridge converter in order to carry out these changes. FIG. 2 shows the comparison between the waveform on the network disturbed by harmonics and the fundamental waveform from the a.c. power source. The controller controls the bridge converter in order that the energy storage element absorbs the energy during the period 12 and retransmits this energy during the period 13 in order to reconstitute the sinusoidal waveform.

As discussed in the introduction, in order to do this the controller uses a rather complicated algorithm which controls the bridge converter depending on the values of current measured in the network in comparison with a reference waveform and the value of the charge stored in the storage element. The controller tries to maintain at all times the charge stored in the storage element at a constant value. Active filters of this type present several problems linked to the complexity of the control algorithm and the use of a storage element which must be charged and recharged and maintained at a constant value of charge.

Figure 3:
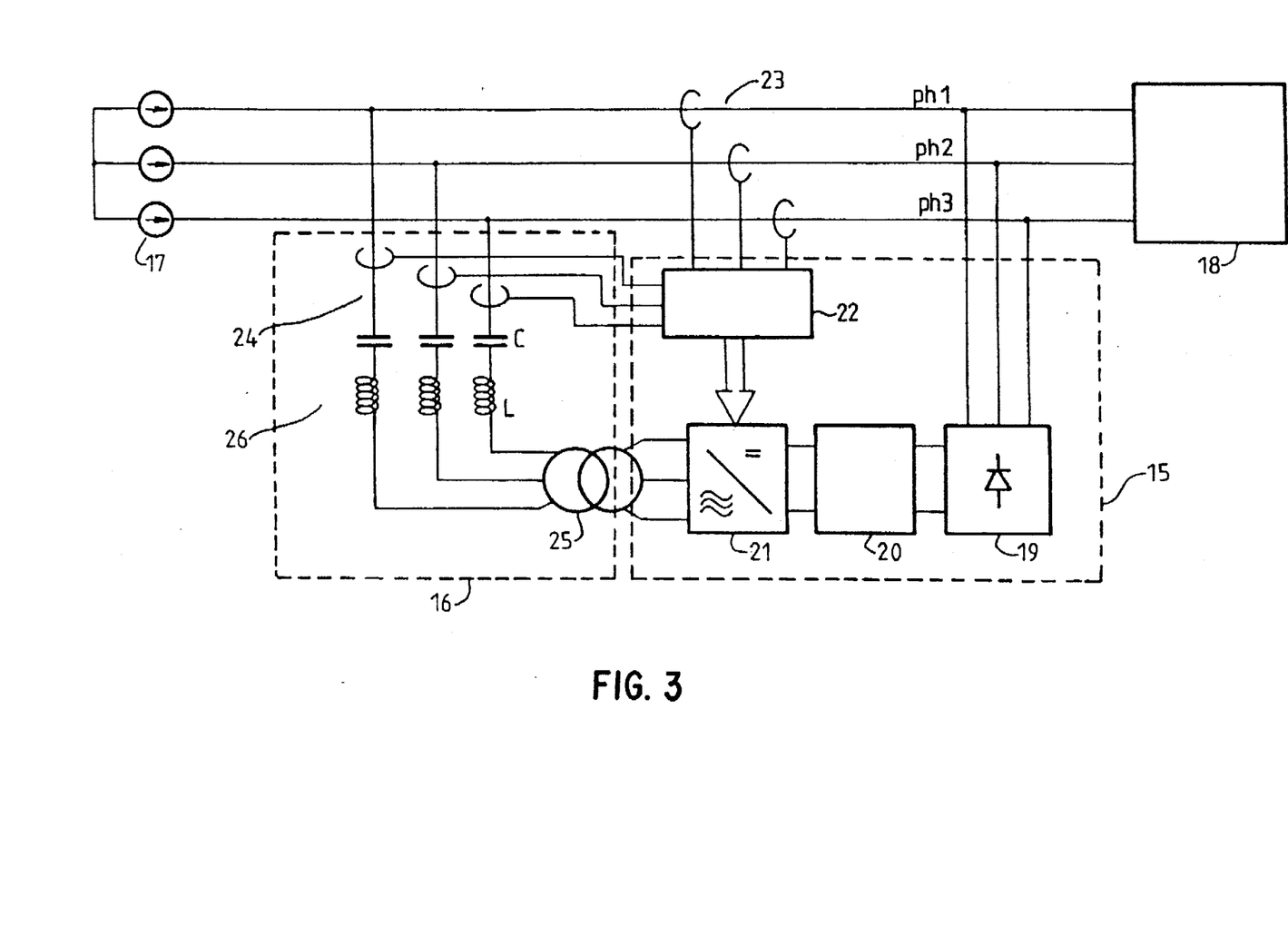
FIG. 3 shows an example of an active filter as per a first embodiment.

FIG. 3 shows an active filter as per one embodiment of the invention, comprising a generator of harmonics 15, which outputs to a coupling circuit 16 comprising a three phase transformer 25 and which may be connected in parallel in the distribution network between the source of a.c. power 17 and the charge or charges 18. The harmonic generator comprises a source of energy comprising an ac/dc rectifier 19, followed by a filtering circuit 20 comprising an inductance and a capacitor which suppresses the ripples in the signal at the output of the rectifier and which ensures the regulation of a permanent continuous voltage. This voltage is then cut by a bridge converter 21 comprising a series of transistor switches and controlled by a control signal of the type PWM (Pulse Width Modulation) supplied by the control means 26. The control means can be realised by a microprocessor and acquires measurements of currents on the phases of the network and on the phases of the coupling circuit via the current sensors 23, 24. The control means controls the bridge converter in order to generate harmonic components synchronised with the disturbing harmonics on the network, but having opposing phase in order to reduce their effect.

Figure 4:
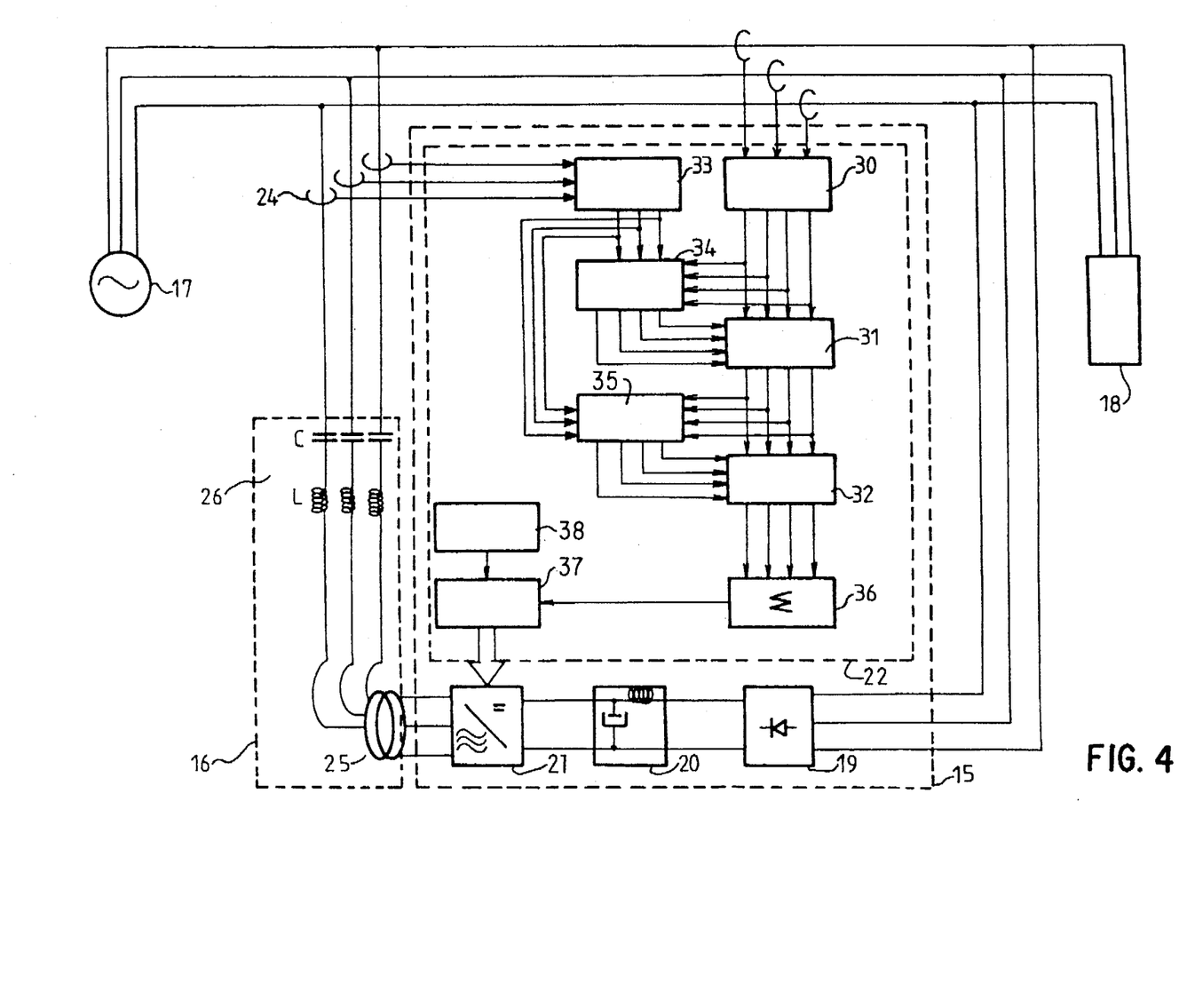
FIG. 4 shows the filter of FIG. 3 in more detail.

FIG. 4 shows in detail the structure of the control means of FIG. 3. The control means comprises a filter circuit 30 connected to the current sensor 23 which eliminates the fundamental component of the current and distinguishes each of the harmonics on the network to produce a series of signals, each signal representing an isolated harmonic component. Each phase is analysed separately. These signals then pass to a processing circuit comprising a dephaser 31 and an amplitude corrector 32. The dephaser 31 dephases the signals supplied by the filter circuit in order to produce a series of signals having opposing phase to the harmonics on the network. The control means further provides a correction circuit comprising a filter circuit 33, connected to the current sensors 24, a phase comparator 34 and an amplitude comparator 35. The filter circuit 33 supplies signals representing each of the harmonic components injected by the coupling circuit, and which are compared by the phase comparator with the signals from the filter circuit 30 in order to detect the phase differences existing between the injected components and those created by the polluting load. The results of these comparisons are applied to the dephaser circuit in order to ensure the phase opposition of the signals. Then, a comparison of the amplitudes of the injected components and the components at the output of the dephaser 31 is carried out by the amplitude comparator 35. The results of these comparisons are applied to the amplitude corrector 32 in order to correct the amplitude of the signals.

The signals present at the output of the amplitude corrector then pass to a summator 36 which sums them in order to obtain a single signal which controls a pulse width modulator circuit 37. In order to ensure that the command signal sent to the bridge converter is synchronised with the network frequency, a mains synchronisation circuit 38 is provided, which is connected to the network and synchronises the operation of the pulse width modulation circuit with changes in the fundamental frequency of the network.

In the filter of FIGS. 3 and 4, each phase is treated independantly. The injection of harmonic components can be carried out by a three phase transformer, the signal for each phase being connected to a terminal of the transformer, or by three monophase transformers.

Figure 5:
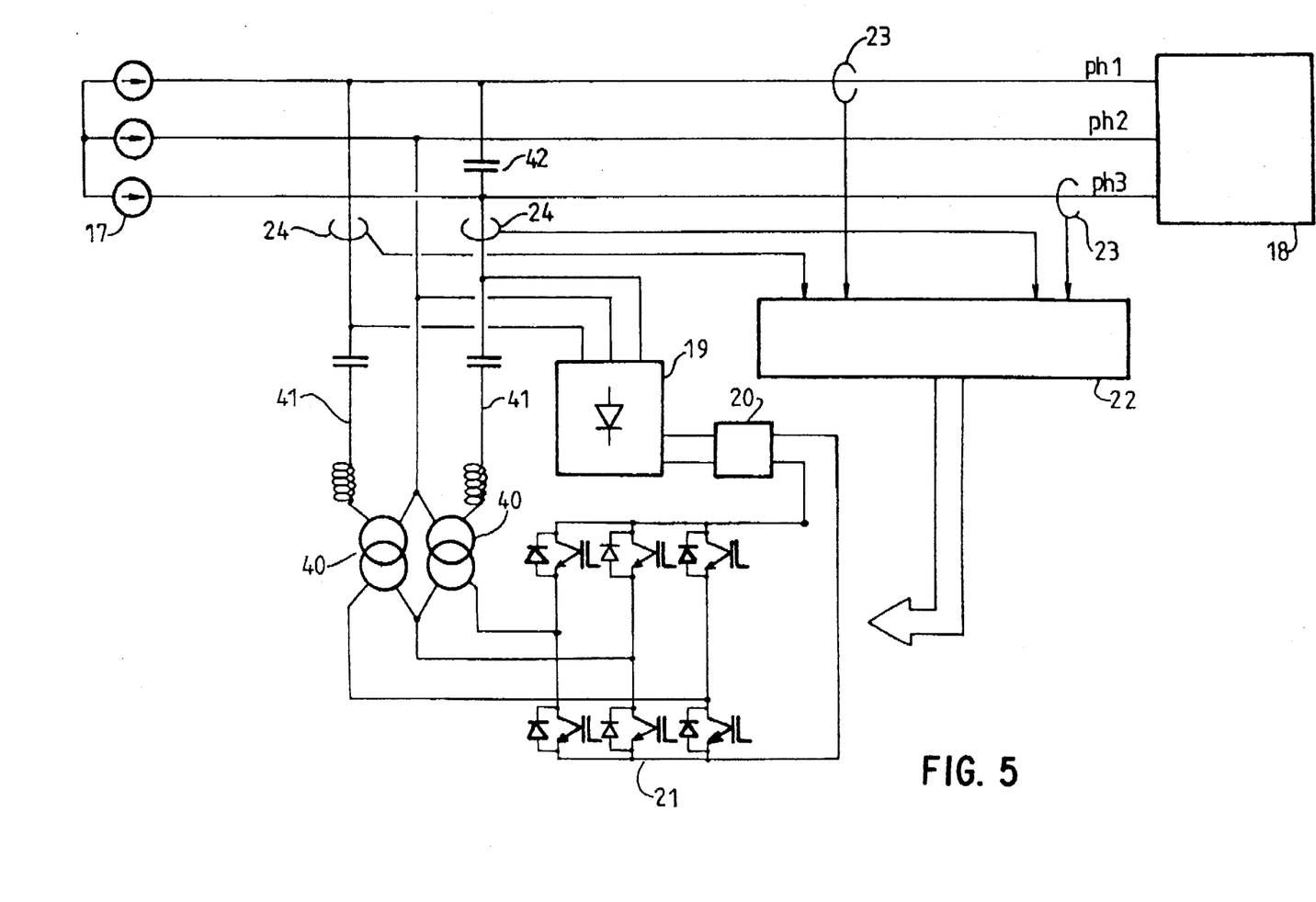
FIG. 5 shows an example of an active filter as per another embodiment adapted to be used with a three phase network.

FIG. 5 shows another embodiment of the invention adapted to be used with a three phase network. The elements having the same function are designated by the same reference numerals. In this figure, the transistor switches of the bridge converter 21 are shown.

In this case, because of the nature of a three phase network, the active filter receives the signals and injects the components on two phases only, the phases ph1 and ph3. The coupling circuit in this embodiment comprises two monophase transformers, connected as shown, with two resonant circuits 41, comprising an inductance and a capacitor in series as before. In view of the capacitors present between the phases ph1 and ph2 and between the phases ph2 and ph3 it is necessary to further connect a third capacitor 42 between the phases ph1 and ph3 in order to avoid disturbing the equilibrium of the installation.

Figure 6:
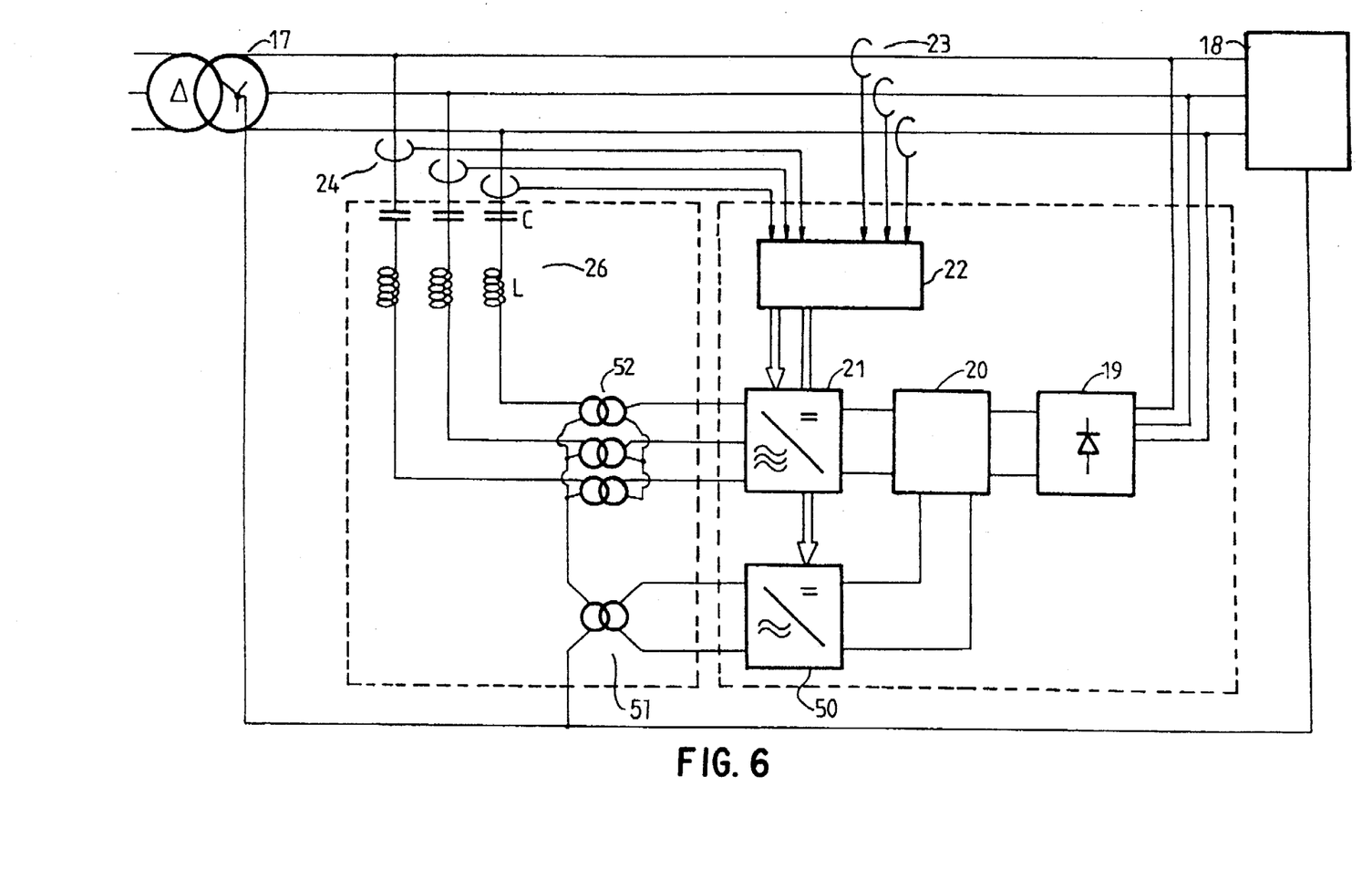
FIG. 6 shows an example of an active filter as per another embodiment adapted to be used with a three phase network with neutral.

Another embodiment for use with a network having a neutral is shown in FIG. 6. In certain cases, polluting harmonics exist which are identical on all three phases. For example, all the harmonics of multiples of three on each one of the phases of a three phase network can be in phase. In this case, these harmonics can be eliminated simply by the injection of correcting components on the neutral. In order to do this, the embodiment of FIG. 6 further comprises a single phase bridge converter 50, connected to the energy source and controlled by the control means so as to inject harmonic components on the neutral via a monophase transformer 51. The other polluting harmonics on the network which are not homopolar are corrected by the injection of individual components on each phase via three transformers 52, as before.

Figure 7:
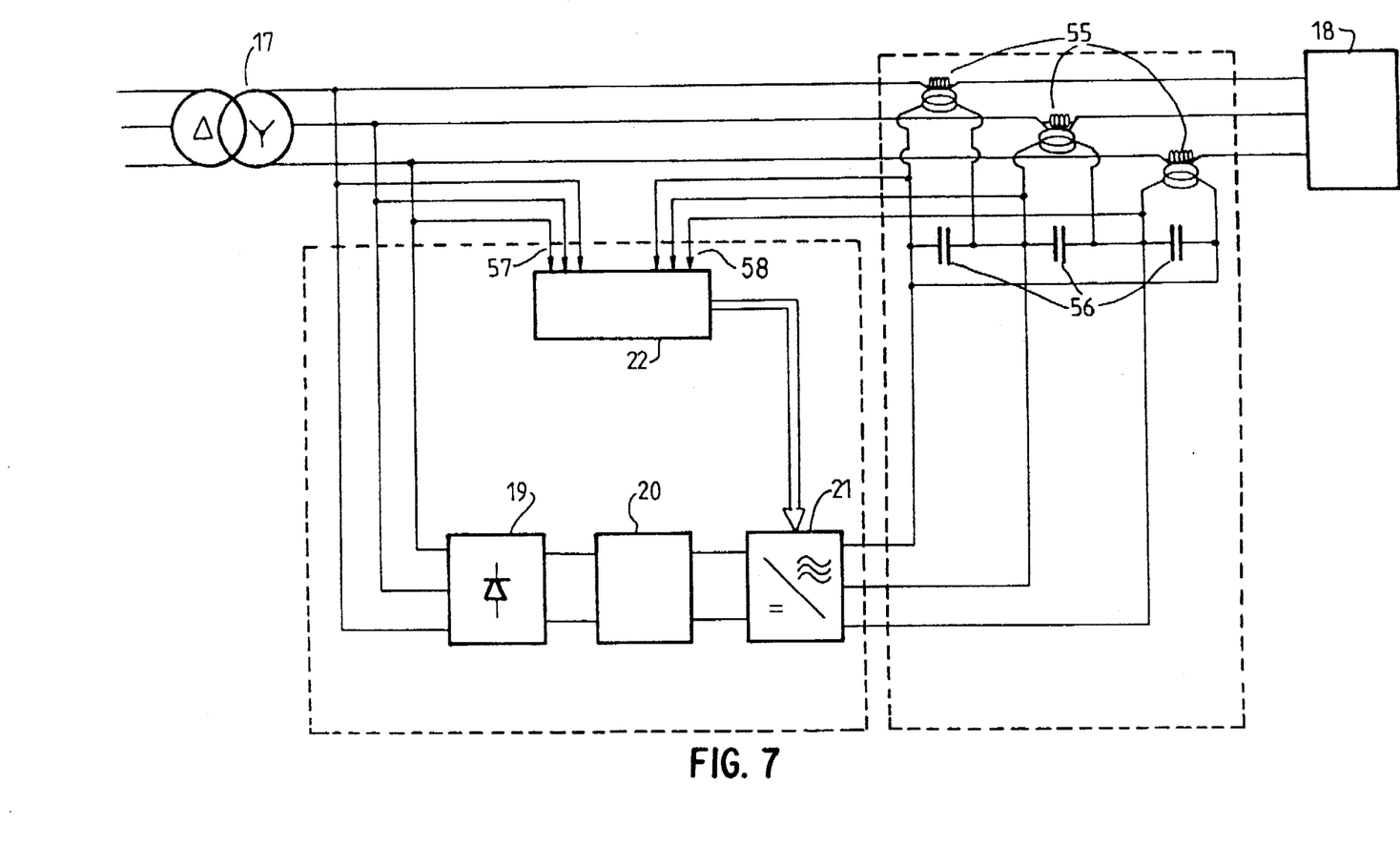
FIG. 7 shows an example of an active filter as per the invention adapted to be connected in series in the network in order to compensate voltage harmonics.

Another embodiment which measures and compensates for voltage harmonics on the network is shown in FIG. 7. In this embodiment, the control means control the bridge converter so as to inject voltages on the supply line via a coupling circuit comprising iron-core transformers 55 and capacitors 56 which block the fundamental current and which are connected in a triangle configuration between the bridge converter and the transformers. The control means measures directly the voltages on the phases via the inputs 57 and the injected voltages via the inputs 58. As before, the control means make a comparison between the injected harmonics and the harmonics on the network in order to minimise the disturbances introduced by the load.

Other embodiments having other methods of control are possible. For example, in the case where the filter is used with a reactive energy compensator comprising a bank of capacitors mounted in parallel with the load, the currents circulating in the compensator can be measured to give a measure of the polluting harmonics on the network and in order to control the harmonics injected. In particular, the measurement of harmonic currents on the network can be made upstream and downstream of the bank of capacitors and the connection point of the network transformer, the result of the measurements being summed and processed. The point of injection of the active filter is situated between the two measurement points.

In certain embodiments the sensors used to measure the injected currents or voltages can be omitted, the control means being adapted to control the injection of harmonics only in response to a measurement of the harmonics present on the network. Equally, a measurement of the voltage harmonics on the network can be used in the control of injection of current harmonics, or vice versa, as per the details of the control means.

We claim:

1. Active filter adapted to compensate polluting harmonies on an electricity distribution network and comprising a source of energy, a bridge converter connected between the source and the network, control means for controlling the bridge converter in order to compensate for polluting harmonics, characterised in that the energy source is not changed by the bridge converter such that the state of the energy source is independant of the control means and such that the control means controls the injection of harmonies on the network by the bridge converter independantly of the state of the energy source.

2. Active filter as claimed in claim 1 further comprising a coupling circuit connected between the bridge converter and the electricity distribution network, the coupling circuit comprising one or more resonant circuits adapted to minimise the power loss during the injection of harmonic components and to block the transmission of the fundamental of the network to the elements of the filter, the tuning frequency of the resonant circuits being a function of the frequencies and amplitudes of the harmonic components to be injected.

3. Active filter as claimed in claim 1 where the control means of the filter comprises a synchronisation circuit which synchronises the control of the bridge converter with the network frequency.

4. Active filter as claimed in claim 1 where the control means comprises a filter circuit connected to the distribution network and permitting the isolation of each one of the polluting harmonics present on the network, and a processing circuit connected to the filter circuit, which produces a series of harmonic components of opposing phase to be injected on the network in order to suppress the polluting harmonics.

5. Active filter as claimed in claim 4 where the control means comprises a summing circuit which sums the harmonic components in order to produce a single signal which controls the bridge circuit in order to inject the harmonic components.

6. Active filter as claimed in claim 4 where the control means comprises a correction circuit which measures and isolates each harmonic injected by the coupling circuit, and which corrects the processing circuit in order to compensate for the remaining differences between the injected harmonics and the polluting harmonics on the network.

7. Active filter as claimed in claim 6 where the correction circuit also corrects the processing circuit to compensate for the differences in amplitude between the injected harmonics and the polluting harmonics on the network.

8. Active filter as claimed in claim 1, adapted to be connected to a polyphase network.

9. Active filter as claimed in claim 2, adapted to be connected to a three phase network, the coupling circuit comprising only two resonant circuits.

10. Active filter as claimed in claim 1, adapted to be connected to a three phase network having a neutral and adapted to inject selected harmonic components on the neutral in order to compensate for polluting harmonics which are homopolar on the phases of the network.

11. Active filter as claimed in claim 10, adapted to inject harmonic components on each phase of the network as well as homopolar harmonic components on the neutral, in order to compensate homopolar and non-homopolar harmonics existing on the network.

12. Active filter as claimed in claim 1, adapted to inject current components in the network.

13. Active filter as claimed in claim 1, adapted to inject voltage components on the network.

* * * * *